(12) United States Patent
Berschel et al.

(10) Patent No.: US 6,686,412 B1
(45) Date of Patent: Feb. 3, 2004

(54) PASTES CONTAINING MATTING AND STRUCTURING AGENTS AND COATING AGENTS CONTAINING SAID PASTES

(75) Inventors: Günter Berschel, Köln (DE); Udo Hellmann, Remscheid (DE); Werner Stephan, Wuppertal (DE); Wolfgang Stricker, Remscheid (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/719,465

(22) PCT Filed: Mar. 23, 2000

(86) PCT No.: PCT/EP00/02556

§ 371 (c)(1),
(2), (4) Date: Dec. 11, 2000

(87) PCT Pub. No.: WO00/63302

PCT Pub. Date: Oct. 26, 2000

(30) Foreign Application Priority Data

Apr. 16, 1999 (DE) .......................................... 199 17 228

(51) Int. Cl.⁷ ........................... C08L 75/02; C08L 75/04
(52) U.S. Cl. ....................... 524/507; 524/451; 524/493; 524/513; 524/514; 524/560; 524/590; 524/600; 524/601; 524/602; 524/604; 524/612
(58) Field of Search ................ 524/493, 507, 524/513, 560, 604, 514, 590, 600, 601, 602, 612, 451

(56) References Cited

U.S. PATENT DOCUMENTS

| | | | | |
|---|---|---|---|---|
| 3,228,897 A | * | 1/1966 | Nellessen | 106/1.25 |
| 3,816,155 A | * | 6/1974 | Iverson et al. | 117/10 |
| 3,904,791 A | * | 9/1975 | Iverson et al. | 427/277 |
| 4,011,195 A | * | 3/1977 | Self | 106/83 |
| 4,097,437 A | * | 6/1978 | Dhake | 260/29.2 |
| 4,657,613 A | * | 4/1987 | Thoma et al. | 156/238 |
| 4,739,020 A | * | 4/1988 | Carson et al. | 525/481 |
| 4,855,164 A | * | 8/1989 | Burkholder et al. | 427/385.5 |
| 4,892,906 A | * | 1/1990 | Pham et al. | 524/730 |
| 5,120,775 A | * | 6/1992 | Vanzegbroeck et al. | 523/443 |
| RE34,730 E | * | 9/1994 | Salatin et al. | 427/407 |
| 5,516,549 A | * | 5/1996 | Jasenof et al. | 427/178 |
| 5,759,630 A | | 6/1998 | Vosskuhl et al. | |
| 5,858,506 A | | 1/1999 | Jasenof et al. | |
| 5,891,960 A | * | 4/1999 | Claar et al. | 525/162 |
| 5,959,001 A | * | 9/1999 | Walz et al. | 523/161 |
| 5,965,272 A | * | 10/1999 | Donnelly et al. | 428/447 |
| 5,972,471 A | * | 10/1999 | Jasenof et al. | 428/141 |

* cited by examiner

Primary Examiner—Judy M. Reddick
(74) Attorney, Agent, or Firm—Bart E. Lerman

(57) ABSTRACT

Pastes containing flatting agents and/or texture additives, containing

A) 5 to 30 wt. % of one or more thixotropic (meth)acrylic copolymers and/or one or more thixotropic polyesters B) 15 to 45 wt. % of one or more flatting and/or texturing agents, C) 30 to 65 wt. % of one or more organic solvents and optionally wetting and dispersing agents, rheology modifiers, catalysts and optionally further additives and auxiliaries, wherein the proportions of components A), B) and C) add up to 100 wt. % and the weight ratio of thixotropic (meth)acrylic copolymer and/or thixotropic polyester: flatting and/or texturing agents is 1:6 to 1:0.8.

12 Claims, No Drawings

PASTES CONTAINING MATTING AND STRUCTURING AGENTS AND COATING AGENTS CONTAINING SAID PASTES

The invention relates to preparations of flatting and texturing agents for incorporation in coating compounds, more particularly in low-emission, high-solids coating compounds, and to the coating compounds containing the flatting and texturing agent preparations. The coating compounds are used preferably in vehicle and vehicle part lacquering.

For certain applications in vehicle and industrial lacquering it is necessary to prepare lacquers which result in surfaces with reduced gloss and/or textured surfaces. For example, lacquered commercial vehicle bodies should have matt surfaces and plastics parts, e.g., external trim parts on vehicles such as bumpers should receive dull and/or textured surfaces. In order to obtain the matt and/or textured surfaces, flatting agents or texture additives are added to the coating compounds. When the applied lacquer film dries, the flatting agent particles produce a microrough surface texture. As a result, the incident light is reflected in a diffuse manner and gives the observer the impression of a matt surface. The flatting agent particles must be distributed homogeneously in the dry lacquer film. The flatting agents and/or texture additives may be incorporated as material in powder or paste form. Conventional flatting agent pastes generally contain, apart from the flatting agents, binders, solvents and optionally additives.

Examples of binders which may be used in flatting agent pastes include alkyd, aldehyde, acrylic, polyester resins and/or cellulose esters.

EP-A-700 408 describes a matt paste suitable for the production of textured coatings on plastics surfaces, which paste is incorporated in coating compounds based on hydroxy-functional binders and polyisocyanate crosslinking agents. The matt paste contains hydroxy-functional polyesters, hydroxy-functional polyacrylates and optionally cellulose esters as binder. Texturing agents are added in powder form to the coating compound.

Often, with the above-mentioned binders which may be used in flatting agent pastes, the surfaces obtained after application of the lacquer are still too glossy, i.e. the flatting effect is still insufficient.

If the coating compounds which are to result in matt/textured surfaces are prepared by means of a mixed lacquer system of the kind used directly in situ on the user's premises, for example, in vehicle refinishing usually to provide a plurality of different hues, such a mixed lacquer system generally contains so-called additional mixed lacquers as well as the coloured mixed lacquers, for example, those for obtaining desired textures or degrees of gloss. The components of such a mixed lacquer system may be present as finished lacquers or semi-finished products.

For ecological reasons, low-emission, high-solids lacquers are also increasingly being used in mixed lacquer systems. Adequate flowability is a prerequisite for problem-free handling and good meterability of the mixed lacquers. It is difficult to achieve good flowability with the above-mentioned additional mixed lacquers containing flatting agents and/or texture additives and in high-solids lacquers because in order to obtain predetermined texture effects or degrees of gloss and due to the high solids content required of the lacquers to be processed, the additional mixed lacquers must contain such large proportions of texturing and/or flatting agents that the products are pasty and no longer free-flowing, making acceptable processing impossible. This disadvantage is not solved by the matt pastes described in EP-A-700 408 either.

Moreover, the preparations containing flatting and/or texturing agents generally have the problem that partially dried particles of said preparations or of the coating agents containing them fall from the edge of the can of the lacquer container in question back into the lacquer and may thus lead to pinholing. It is not possible to screen these particles from the lacquer prior to application since the texturing agent would then be removed too. Lacquers containing flatting agents often do not result in a uniform spray pattern. Unsightly patches form, particularly on fairly large surfaces to be lacquered.

The object of the invention was, therefore, to provide flatting agent and/or texturing agent preparations, more particularly for low-emission, high-solids coating agents in paste form which, whilst giving a very good flatting effect and texture, have good flowability and guarantee problem-free meterability. The preparations in paste form should be easy to process. Partially dried particles of said preparations or of the coating agents containing them should be substantially crumb-free and should remain adhering to the can edge of the lacquer containers in question in order to prevent pinholing and consequent lacquer defects. Moreover, the preparations in paste form should be stable in storage and exhibit no settling even after prolonged storage. The lacquers containing the pastes should result in a uniform spray pattern, particularly on relatively large surfaces.

The object is achieved by preparations of flatting agents and/or texture additives in paste form, hereinafter known as flatting agent pastes, containing A) 5 to 30 wt. %, preferably 7 to 25 wt. % of one or more thixotropic (meth)acrylic copolymers and/or of one or more thixotropic polyesters, B) 15 to 45 wt. %, preferably 20 to 35 wt. % of one or more flatting and/or texturing agents, C) 30 to 65 wt. %, preferably 35 to 55 wt. % of one or more organic solvents and optionally wetting and dispersing agents, rheology modifiers, catalysts and optionally further additives and auxiliaries, wherein the proportions of components A), B) and C) add up to 100 wt. % and the weight ratio of thixotropic (meth)acrylic copolymer and/or thixotropic polyester: flatting and/or texturing agents is 1:6 to 1:0.8.

Surprisingly, it was found that the object according to the invention may be achieved by using thixotropic (meth)acrylic copolymers and/or thixotropic polyesters in the flatting agent paste. It could not have been expected that the thixotropic resins used which, in their form of application, are generally present as compact substances, may be filled with the required amounts of flatting and/or texturing agents and result in free-flowing pastes.

Thixotropic (meth)acrylic copolymers and/or thixotropic polyesters (component A) are contained as binders in the flatting agent paste according to the invention. The term thixotropic resins means, for example, resins modified by adding thixotropic agents which exhibit a decrease in viscosity under shear stress and after the shear stress regain their original viscosity in the resting state, albeit with a time lag. The thixotropic behaviour of the resins may be achieved by various methods, which will be discussed in more detail below.

The thixotropic resins to be used according to the invention are those based on (meth)acrylic copolymers and/or polyesters, preferably those based on hydroxy-functional (meth)acrylic copolymers and/or hydroxy-functional polyesters.

(Meth)acrylic copolymers which may be used in component A preferably have a hydroxyl value from 25 to 200, particularly preferably from 40 to 150 and an acid value from 0 to 50. The (meth)acrylic copolymers have a number-average molecular weight (Mn) from 1500 to 30,000 g/mole, preferably from 2000 to 15,000 g/mole.

The preparation of the (meth)acrylic resins may be carried out by polymerisation according to conventional methods, e.g., bulk, solution or suspension polymerisation. The various polymerisation processes are known to the skilled person. The solution polymerisation process is preferred for the preparation of (meth)acrylic resins. The solvent is generally charged to the reaction vessel, heated to boiling point and the monomer/initiator mixture fed in continuously over a certain period. Polymerisation may be carried out preferably at temperatures from 100° C. to 160° C.

Suitable initiators are per- and azo compounds. An amount from 0.2 to 8 wt. % of initiators, based on the initial weight of monomers, is used in preference.

Examples of suitable organic solvents which may be used advantageously in solution polymerisation include: alcohols, glycol ethers such as ethylene glycol dimethyl ether, propylene glycol dimethyl ether; glycol ether esters such as ethyl glycol acetate, butyl glycol acetate, 3-methoxy-n-butyl acetate, butyl diglycol acetate, methoxy propyl acetate, esters such as butyl acetate, isobutyl acetate, amyl acetate; ketones such as methyl ethyl ketone, methyl isobutyl ketone, cyclohexanone, isophorone, aromatic hydrocarbons (e.g. with a boiling range from 136° C. to 180° C.) and aliphatic hydrocarbons.

Chain transfer agents such as, e.g., mercaptans, thioglycolates, cumene, dimeric alpha-methylstyrene may be used to control the molecular weight.

The (meth)acrylic copolymers to be used are preferably copolymers with vinyl aromatic monomers, such as, e.g., styrene or derivatives thereof, particularly preferably with styrene. The copolymers preferably have a styrene content of at least 30 wt. %.

Hydroxyl groups present in preference are introduced into the (meth)acrylic resin using monomers containing hydroxyl groups. Moreover, further ethylenically unsaturated monomers of the kind known to the skilled person for free-radical polymerisation are suitable as monomers capable of free-radical polymerisation. These may be unsaturated monomers with functional groups, e.g., carboxyl groups or glycidyl groups, and conventional unsaturated monomers without further functional groups.

Examples of olefinically unsaturated monomers having hydroxyl groups include hydroxyalkyl esters or hydroxyaryl esters of unsaturated carboxylic acids. Hydroxyalkyl esters of acrylic acid or methacrylic acid with aliphatic diols having 2 to 20 carbon atoms are preferred. Examples of such hydroxyalkyl esters with a primary hydroxyl group are hydroxyethyl (meth)acrylate, hydroxypropyl (meth)acrylate, hydroxybutyl (meth)acrylate, hydroxyamyl (meth)acrylate, neopentyl glycol monoacrylate, hydroxyhexyl (meth)acrylate, hydroxyoctyl (meth)acrylate. Examples of hydroxyalkyl esters with a secondary hydroxyl group are 2-hydroxypropyl (meth)acrylate, 2-hydroxybutyl (meth)acrylate, 3-hydroxybutyl (meth)acrylate. The corresponding esters of other unsaturated carboxylic acids such as, e.g., crotonic acid or isocrotonic acid may also, however, be used.

A further group of OH-functional monomers are hydroxyalkyl amides of unsaturated carboxylic acids such as, e.g., acrylic acid, methacrylic acid and fumaric acid. Examples hereof are N-hydroxyethyl methacrylic acid amide, N-(2-hydroxypropyl)-methacrylamide or N-hydroxyalkyl flimaric acid mono- or diamide. Reaction products of one mole of hydroxyallryl (meth)acrylate and 2 moles of epsilon caprolactone and adducts of (meth)acrylic acid and glycidyl esters of saturated alpha,alpha-dialkyl alkane monocarboxylic acids, for example, glycidyl esters of versatic acid, are also highly suitable.

Other unsaturated compounds containing hydroxyl groups are allyl alcohol, monovinyl ethers of polyalcohols, particularly of diols such as, e.g., the monovinyl ether of ethylene glycol or of butane diol, allyl ethers or esters containing hydroxyl groups such as 2,3-dihydroxypropyl monoallyl ether, trimethylolpropane monoallyl ether or 2,3-dihydroxypropanoic acid allyl ester and glycerol mono (meth)acrylate.

Hydroxyalkyl (meth)acrylates are particularly suitable, such as in particular hydroxyethyl (meth)acrylate, hydroxypropyl (meth)acrylate and hydroxybutyl (meth)acrylate.

Examples of suitable unsaturated monomers without further functional groups include esters of unsaturated monocarboxylic acids with aliphatic monohydric, branched or unbranched and cyclic alcohols having 1 to 20 carbon atoms. These are preferably esters of acrylic or methacrylic acid. Examples of esters with aliphatic alcohols are methyl acrylate, ethyl acrylate, isopropyl acrylate, tert.-butyl acrylate, n-butyl acrylate, isobutyl acrylate, 2-ethylhexyl acrylate, 2-ethylhexyl acrylate, lauryl acrylate, stearyl acrylate and the corresponding methacrylates. Examples of esters with cyclic alcohols are cyclohexyl (meth)acrylate, trimethyl cyclohexyl (meth)acrylate, 4-tert. butylcyclohexyl (meth)acrylate and isobornyl (meth)acrylate.

Further unsaturated monomers are, for example, vinyl esters such as vinyl acetate. Ethylenically polyunsaturated monomers may also, however, be used. These are monomers having at least two double bonds capable of free-radical polymerisation. Examples hereof are divinyl benzene, butane 1,4-diol diacrylate, hexane 1,6-diol diacrylate, neopentyl glycol dimethacrylate, glycerol dimethacrylate.

Preferred monomer components for the preparation of the (meth)acrylic copolymers are alkyl esters and hydroxyalkyl esters of (meth)acrylic acid and styrene as well as optionally other alpha-, beta-unsaturated monomers and/or optionally (meth)acrylic acid. Examples of alkyl esters are those having 1 to 7 carbon atoms in the alkyl radical, e.g., methyl (meth)acrylate, ethyl (meth)acrylate, butyl (meth)acrylate, pentyl (meth)acrylate and cyclohexyl (meth)acrylate. Examples of hydroxyalkyl esters are hydroxyethyl (meth) acrylate, hydroxypropyl (meth)acrylate, butane 1,4-diol monoacrylate, hexane 1,6-diol monomethacrylate and reaction products of hydroxyalkyl (meth)acrylates with epsilon caprolactone.

Polyesters which may be used in component A preferably have a hydroxyl value from 25 to 200, particularly preferably from 40 to 150 and an acid value from 0 to 50. The polyesters preferably have a number-average molecular weight (Mn) from 1000 to 6000, preferably from 1000 to 3000. The polyesters are polycondensation products of polyvalent polycarboxylic acids or anhydrides thereof and polyhydric polyols, optionally with the use of monocarboxylic acids. In order to obtain appropriate OH values, the polyesters are prepared preferably with an excess of alcohol. If the polyesters are to contain carboxyl groups, these may be obtained by incomplete esterification or by using monomers containing carboxyl groups.

Examples of suitable polycarboxylic acids are aromatic, cycloaliphatic and aliphatic such as, e.g., ortho-phthalic anhydride, isophthalic acid, tetrahexahydrophthalic acid, 1,4-cyclohexane dicarboxylic acid, 4-methylhexahydrophthalic acid, succinic acid (anhydride), adipic acid, sebacic acid and dimeric fatty acid.

Examples of suitable alcohol components include glycols such as ethylene glycol, polyethylene glycols, butane diols, neopentyl glycol, cyclohexane dimethanol, trimethyl pentane diol and higher alcohols, such as, e.g., trimethylol ethane and pentaerythritol.

Optionally, natural and synthetic monocarboxylic acids may also be used in addition, e.g., benzoic acid, lauric acid, fatty acids of naturally occurring oils.

The (meth)acrylic resins and/or polyester resins may be rendered thixotropic in the conventional manner. The various possibilities are well known in the art and are known to the skilled person. For example, conventional thixotropic agents may be used. It is assumed that thixotropy in the resin is developed substantially by way of H-bridge formation.

For example, so-called SCA agents (SCA=Sag Control Agent) may be used to obtain thixotropic behaviour. These substances are generally low molecular weight, semi-crystalline organic compounds based on urea. Such compounds are generally prepared from monoamines and/or polyamines and/or polymeric substances having at least one amino group, and from mono- and/or polyisocyanates and/or polymeric substances having at least one isocyanate group. A large number of these SCA agents and the processes for the preparation thereof are described in the literature.

Polyurethanes, polyurethane ureas and/or polyamides may also be used to obtain thixotropic behaviour. Thixotropic behaviour is obtained preferably with polyurethanes or polyurethane ureas. The polyurethanes and polyurethane ureas are, for exanple, reaction products of isocyanate compounds, e.g., diisocyanates and/or polyisocyanates, and hydroxy-functional components, e.g., hydroxy-functional (meth)acrylates and/or polyesters and/or low molecular weight hydroxy-functional compounds and/or mono- and/or polyamines. Optionally, the reaction products may also have ether groups. Starting substances used in preference are compounds having aromatic structures.

In the thixotropic (meth)acrylic and/or polyester resins, the proportions of (meth)acrylic and/or polyester to the proportions of thixotropic agents, e.g., the polyurethane proportions, are for example in the weight ratio from 95:5 to 50:50, preferably 90:10 to 55:45. The thixotropic (meth) acrylic and/or polyester resins preferably have a nitrogen content from, for example, 10 to 150 mmole/100 g of solid resin, preferably from 20 to 100 mmole/100 g of solid resin. The thixotropic resins may be prepared, for example, by preparing the individual constituents separately and then mixing them or combining them in a suitable manner. The thixotropic resins may also be prepared, for example, by preparing the thixotropic agents in the presence of the (meth)acrylic and/or polyester resins.

The thixotropic (meth)acrylic and/or polyester resins are generally present in the solvent form with various solids proportions. Examples of suitable solvents include those of the kind already mentioned for the preparation of the (meth) acrylic copolymers. Examples of solvents are alcohols, esters such as ethyl acetate, isopropyl go acetate, n-propyl acetate, isobutyl acetate and 2-ethylhexyl acetate, aromatic hydrocarbons such as toluene, o-, m-, p-xylene, ethylbenzene, Solvesso 100 (mixture of aromatic hydrocarbons with a boiling range from 153° C. to 180° C.), aliphatic hydrocarbons.

The resins may be in solvent form, for example, with a solids content from 40 to 85 wt. %.

Thixotropic (meth)acrylic and/or polyester resins which may be used are known to the skilled person and also available as commercial products. Thixotropic (meth)acrylic resins are available, for example, under the name Jagotex® F216 THIX, Jagotex® F219 THIX, Jagotex SCA-Y, Halwemer F 2200 or Setalux C-91389 VX-45. Thixotropic polyester resins are available, for example, under the name of Jägapol PE 300 THIX.

(Meth)acrylic copolymers which have been rendered thixotropic with polyurethanes and/or polyureas and/or polyurethane ureas may be used particularly advantageously.

Apart from the thixotropic (meth)acrylic and/or polyester resins, the flatting agent paste according to the invention also contains one or more flatting and/or texturing agents (component B). The flatting agents may be of an inorganic or organic nature. Examples of inorganic flatting agents are amorphous or pyrogenic silica, silica gels and layered silicates, e.g., hydrated magnesium silicate (talc). The inorganic flatting agents may be untreated, or surface-treated with organic compounds, e.g., with suitable wax types or with inorganic compounds. Examples of organic flatting agents are Al, Zn, Ca or Mg stearate, waxy compounds such as, e.g., micronised polypropylene waxes, and urea-formaldehyde condensates. Flatting agents are available as commercial products (e.g. under the name Syloid®) and are known to the skilled person. They are supplied in various particle sizes. The chosen particle size of the flatting agents may be adjusted closely to the dry film thickness in the usual manner in order to guarantee the desired compromise between good flatting effect and surface smoothness. Coarse flatting agents exhibit a greater flatting effect for the same pore volume, but also produce a rougher film surface. The average particle size may be, for example, 2 to 16 $\mu$m.

Examples of suitable texturing agents include ground plastics such as, e.g., ground polyamide or ground polypropylene. Corresponding products are available, e.g., under the trade names Propyltex, Vestosint and Orgasol. Moreover, ground sand or ground glass may be used as texturing agents. The particle size of the texturing agents is preferably in the range from 30 to 200 $\mu$m.

During the preparation of the flatting agent pastes it has proved advantageous to use, as flatting agent, 65 to 90 wt. %, based on the total amount of flatting and/or texturing agents, of platelet-like fillers with a flatting effect. Examples of platelet-like fillers with a flatting effect are hydrated magnesium silicate (talc) and platelet-like intergrown minerals such as platelet-like intergrowths of mica, chlorite and quartz. The flatting agent paste according to the invention contains one or more organic solvents (component C). These may be conventional solvents which may be used for a lacquer formulation.

More particularly, these may be glycol ethers such as ethylene glycol dimethylether, propylene glycol dimethyl ether; glycol ether esters such as ethyl glycol acetate, butyl glycol acetate, 3-methoxy-n-butyl acetate, butyl diglycol acetate, methoxypropyl acetate; esters such as butyl acetate, isobutyl acetate, amyl acetate; ketones such as methyl ethyl ketone, methyl isobutyl ketone, cyclohexanone, isophorone and aromatic or aliphatic hydrocarbons.

The flatting agent paste according to the invention may also contain wetting and dispersing agents, rheology modifiers, catalysts and optionally further additives and auxiliaries.

Examples of suitable wetting and dispersing agents include those based on polyester polyacrylic acid and/or polyacrylate. Examples of suitable rheology modifiers include those based on pyrogenic silica, based on layered silicates, hydrogenated castor oils and polymeric urea or urea-urethane compounds. These products are also well known to the skilled person and available commercially, for example, the various Disperbyk and Byk types from Byk-Chemie, or the various Efka types from Efka. The wetting and dispersing agents and rheology modifiers are used preferably in amounts from 0.3 to 8 wt. % based on the total amount of flatting agent paste.

Catalysts optionally present in the flatting agent paste may serve, for example, to catalyse the crosslinking reaction taking place in the finished coating compound, in so far as crosslinkable binders are used. In the case of isocyanate-crosslinking binder systems containing hydroxyl groups, examples of suitable catalysts include organic tin compounds or tertiary amines.

The additives optionally used are conventional lacquer additives such as, for example, anti-settling agents, levelling agents, plasticisers and light stabilisers.

The flatting agent paste is prepared in the conventional manner by mixing and dispersing the individual components.

The flatting agent pastes according to the invention obtained in this way are very free-flowing and meterable and may be incorporated without difficulty in, e.g., high-solids coating compounds. Partially dried residues of flatting agent pastes or of the lacquers containing them remain adhering to the lacquer containers in question (no crumbling). The fact that the flatting agent pastes may be used as additional mixed lacquers in a high-solids mixed lacquer system due to the good flow and processing properties is a particular advantage.

The invention also relates, therefore, to coating compounds which contain the flatting agent pastes according to the invention, and to the use of the flatting agent pastes in pigmented and unpigmented coating compounds, particularly the use in pigmented top coats. The coating compounds are the clear lacquers or pigmented top coats known to the skilled person which are usually used in vehicle lacquering and refinishing. They may be one-pack, two-pack or multi-component lacquers.

The coating compounds contain a) one or more film-forming binders, b) optionally one or more crosslinking agents, c) a flatting agent paste as described above, and optionally one or more organic solvents, pigments, fillers, conventional lacquer additives and auxiliaries.

Film-forming binders used may be physically drying or chemically crosslinking binders. These are all the types of binders known to the skilled person, of the kind usually used in solvent-based clear lacquers and pigmented top coats in the field of vehicle lacquering, particularly vehicle refinishing. Examples of physically drying binders include polyacrylic, polyurethane and polyester resins, which may also optionally be modified. The resins may be used on their own or in combination. The chemically crosslinking binders are preferably binder systems based on hydroxyl group-containing binders and polyisocyanate crosslinking agents.

Optionally, reactive thinners may also be contained in the binder systems.

Preferred coating compounds thus contain
a) one or more hydroxyl group-containing polyaddition, polymerisation and/or polycondensation resins,
b) one or more polyisocyanates as crosslinking agents,
c) a flatting agent paste, as described above
and optionally one or more organic solvents, pigments, fillers, conventional lacquer additives and auxiliaries.

The components a) and b) are used preferably in an amount such that the ratio of hydroxyl groups of component a) to the isocyanate groups of component b) is 1:3 to 3:1. If the thixotropic resins used are hydroxy-functional resins, said resins must also be taken into account when calculating the OH/NCO ratios.

Examples of hydroxyl group-containing binder components a) which may be used include polyurethanes, polyesters and polyacrylates, alone or in combination. The resins generally have a hydroxyl value from 20 to 250 mg KOH/g and may optionally be modified. Polyacrylic resins with hydroxyl values from 80 to 200 mg KOH/g and acid values from 0 to 40 mg KOH/g are used in particular preference as hydroxyl group-containing binder component a). The polyacrylic resins have a preferred number-average molecular weight Mn from 1000 to 20,000, particularly preferably from 1000 to 10,000.

The polyacrylates which may be used in preference are prepared by free-radical polymerisation of olefinically unsaturated monomers, preferably by solution polymerisation.

The hydroxyl groups are introduced into the polyacrylic resin using hydroxyl group-containing monomers. Moreover, practically all the olefinically unsaturated monomers of the kind commonly used for free-radical polymerisation are suitable as monomers capable of free-radical polymerisation. They may be unsaturated monomers with functional groups, e.g., carboxyl groups or glycidyl groups, and conventional unsaturated monomers without further functional groups. Reference is made to the above description of the (meth)acrylic resins present in the flatting agent paste for the description of suitable monomer groups and for the preparation of the polyacrylates.

The individual monomers are used in amounts such that desired hydroxyl and acid values are obtained.

The poly(meth)acrylates which may be used in preference as binder component a) may be used on their own or in combination. They may also be present in mixture with further hydroxy-functional components, e.g., hydroxy-functional polyesters and/or polyurethanes, and with hydroxyl- and/or amino group-containing reactive thinners.

Examples of the polyisocyanates (component b) which may be used as crosslinking agents include any organic polyisocyanates with aliphatically, cycloaliphatically, araliphatically and/or aromatically bound free isocyanate groups. The polyisocyanates are liquid at room temperature or liquefied by the addition of organic solvents. The polyisocyanates generally have a viscosity from 1 to 6000 mPas at 23° C., preferably over 5 and under 3000 mPas.

The polyisocyanates are preferably polyisocyanates or polyisocyanate mixtures having exclusively aliphatically and/or cycloaliphatically bound isocyanate groups with an average NCO functionality from 1.5 to 5, preferably 2 to 4.

For example, the so-called "lacquer polyisocyanates" based on hexamethylene diisocyanate, 1-isocyanato-3,3,5-trimethyl-5-isocyanatomethyl cyclohexane (IPDI) and/or bis(isocyanatocyclohexyl)methane and the inherently known derivatives of said diisocyanates having biuret, allophonate, urethane and/or isocyanurate groups are particularly suitable.

1,1,6,6-Tetramethylhexamethylene diisocyanate, 1,5-dibutylpentamethyl diisocyanate, p- or m-tetramethylxylylene diisocyanate are also suitable. Further examples of suitable polyisocyanates are 1,4-cyclohexane-, 1,2-cyclohexane diisocyanate, tetramethylene-, pentamethylene diisocyanate.

The diisocyanates may be reacted in the conventional manner to higher-functionality compounds, for example, by trimerisation or by reaction with water or polyols, such as, e.g., trimethylol propane or glycerol.

The flatting agent paste according to the invention is contained in the coating compounds as component c). The proportion of flatting agent paste in the coating compound may vary relatively widely. For example, 5 to 60 wt. %, preferably 20 to 55 wt. % of flatting agent paste may be contained in the total coating compound. The amount to be used depends, for example, on the binder system or lacquer system in question, and on the gloss to be obtained and/or the texture effect to be obtained.

One or more organic solvents, pigments, fillers and/or conventional lacquer additives may be contained in the coating compounds.

The solvents may originate from the preparation of the binders or may be added separately. These are conventional lacquer solvents known to the skilled person. Examples of suitable solvents are glycol ethers such as ethylene glycol dimethyl ether, propylene glycol dimethyl ether; glycol ether esters such as ethyl glycol acetate, butyl glycol acetate, 3-methoxy-n-butyl acetate, butyl diglycol acetate, methoxypropyl acetate; esters such as butyl acetate, isobutyl acetate, amyl acetate; ketones such as methyl ethyl ketone, methyl isobutyl ketone, cyclohexanone, isophorone, aromatic hydrocarbons (e.g., with a boiling range from 136° C.–180° C.) and aliphatic hydrocarbons.

Conventional inorganic and/or organic coloured pigments and/or fillers and transparent pigments may be contained in the coating agents. Examples of inorganic or organic coloured pigments or fillers are titanium dioxide, micronised titanium dioxide, iron oxide pigments, carbon black, micronised mica, azo pigments, phthalocyanine pigments, quinacridone or pyyrolopyrrole pigments, silica, barium sulfate, aluminium and magnesium silicate.

Special-effect pigments may also be contained in the coating compounds. Examples of special-effect pigments are: metallic pigments, e.g. of aluminium, copper or other metals; interference pigments such as, e.g., metal oxide-coated metallic pigments, e.g., titanium dioxide-coated or mixed oxide-coated aluminium, coated mica, such as, e.g., titanium dioxide-coated mica and graphite special-effect pigments.

Moreover, the coating compounds may contain lacquer additives, for example, rheology modifiers such as fine-particle silica, layered silicates or polymeric urea compounds. Anti-settling agents, levelling agents, light stabilisers, anti-foaming agents such as, for example, silicone-containing compounds, wetting agents and adhesion-promoting substances may also be used.

The additives and auxiliaries are used in conventional amounts known to the skilled person.

The preferred coating compounds are two-pack systems. The components a) and b) which react together must therefore be stored separately. They are mixed together only shortly before application, optionally with pigments, fillers and additives. If necessary, solvents may be used to adjust the spray viscosity.

The flatting agent pastes according to the invention may be added in various ways to the coating compounds. If the lacquer to be produced is to be prepared from the base upwards, the flatting agent paste may be added as a component during the preparation of the hydroxy-functional component, generally as a base component. If the lacquer to be produced is prepared by means of a mixed lacquer or modular system, the flatting agent pastes may, as an additional mixed lacquer, be a constituent of the mixed lacquer or modular system and are processed to the finished lacquer according to a predetermined mixing formula with other colour-imparting and/or special-effect imparting mixed lacquers or modular components.

In view of the good flow and processing properties of the flatting agent pastes which remain guaranteed even with high proportions of flatting and/or texturing agents, the flatting agent pastes according to the invention may be used particularly advantageously in a high-solids mixed lacquer system as an additional mixed lacquer. Naturally, the flatting agent pastes may also be used in mixed lacquer systems with a lower solids content and generally for the preparation of medium-solids or low-solids lacquers.

The flatting agent pastes according to the invention can be metered easily. Even after prolonged storage, no settling of the texturing and/or flatting agents is apparent in the pastes.

The coating compounds containing the flatting agent pastes are particularly suitable for the preparation of pigmented or transparent top coats of an air-drying or forced-drying multilayer coating. They may also, however, be cured at relatively high temperatures from, e.g., 80° C. to 140° C. The coating compounds containing the flatting agent pastes result in a uniform spray pattern even on relatively large surfaces. No unsightly patches are formed.

The flatting agent pastes and the coating compounds containing them may be used in vehicle and industrial lacquering, particular vehicle refinishing. They may be used for coating metal substrates, but also for coating plastics substrates. The fact that no additional elasticising agents are required in the lacquer for plastics because the flatting agent pastes simultaneously exert an elasticising effect is also an advantage in the coating of plastics parts.

The coating compounds containing the flatting agent pastes are applied by well known methods, preferably by spraying. A transparent clear lacquer layer may, for example, be applied to conventional or aqueous base lacquers, whereupon both layers are cured together, e.g., for 15 to 45 minutes at, e.g., 40° C. to 80° C. A pigmented top coat layer may be applied to conventional 1-pack or 2-pack surfacer layers and cured in a similar manner.

Depending on the gloss required, coatings with matt or dull surfaces may be obtained with the coating compounds containing the flatting agent pastes according to the invention. If texturing agents are added, the desired texturing effect is well developed.

The invention will be explained in more detail on the basis of the examples below.

EXAMPLES

1a) Preparation of a flatting agent paste

A paste is prepared from the following constituents by mixing and dispersing:

30.0 parts by wt. of a thixotropic acrylic resin, 60% in xylene (Halwemer F2200)

4.0 parts by wt. of a commercial wetting agent 25.0 parts by wt. of talc 4.0 parts by wt. of a commercial flatting agent based on pyrogenic silica 0.02 parts by wt. of dibutyltin dilaurate 35.3 parts by wt. of butyl acetate 1b) Preparation of a texturing paste A paste is prepared from the following constituents by mixing and dispersing:

30.0 parts by wt. of a thixotropic acrylic resin, 60% in xylene (Halwemer F2200)

10.0 parts by wt. of a commercial anti-settling agent 8.0 parts by wt. of a commercial flatting agent based on pyrogenic silica 13.0 parts by wt. of a commercial texturing agent based on polyamide granules 34.0 parts by wt. of butyl acetate.

The pastes thus prepared are free-flowing. Partially dried residues of the pastes and of the lacquers containing them are substantially crumb-free and remain adhering, e.g., to the edge of the can. The pastes does not exhibit any settling, even after prolonged storage.

2) Preparation of a top coat 2a) with flatting agent paste One part by volume of the flatting agent paste prepared according to 1a) is mixed thoroughly with one part by volume of a base component (Standox Standocryl® 2-pack HS top coat, blue) and one part by volume of a polyisocyanate hardener (Standox® 2-pack HS hardener, short).

2b) with texturing paste

One part by volume of the texturing paste prepared according to 1b) is mixed thoroughly with one part by volume of a base component (Standocryl® 2-pack HS top coat, blue) and one part by volume of a polyisocyanate hardener (Standox® 2-pack HS hardener, short).

The top coats thus obtained are applied to plastics substrates coated in each case with conventional primers and surfacers. After a flash-off time of 10 minutes, curing is carried out for 30 minutes at 60° C.

Matt and textured surfaces which satisfy the usual requirements in respect of a plastics lacquering are obtained. The top coats result in a uniform spray pattern without the formation of unsightly patches.

What is claimed is:

1. A paste comprising:
   A) 5 to 30 wt. % of at least one thixotropic polymer selected from the group consisting of thixotropic (meth)acrylic copolymers, thixotropic polyesters and mixtures thereof, wherein the at least one thixotropic polymer of component A) is rendered thixotropic by the addition of thixotropic agents containing nitrogen to a non-thixotropic polymer selected from the group consisting of (meth)acrylic coploymers, polyesters and mixtures thereof;
   B) 15 to 45 wt. % of at least one agent selected from the group consisting of flatting agents, texturing agents and mixtures thereof;
   C) 30 to 65 wt. % of at least one organic solvent;
and optionally wetting and dispersing agents; rheology modifiers; catalysts selected from the group consisting of organic tin compounds and tertiary amines; and optionally further additives selected from the group consisting of anti-settling agents, leveling agents, plasticizers, and light stabilizers; wherein the proportions of components A), B) and C) add up to 100 wt. % and the weight ratio of the at least one thixotropic polymer of A): the at least one agent of B) is 1:6 to 1:0.8.

2. A paste according to claim 1, wherein the thixotropic agents are selected from the group consisting of sag control agents, polyurethanes, polyurethane ureas, polyureas, polyamides and mixtures thereof.

3. A paste according to claim 1, wherein the non-thixotropic polymer and the thixotropic agents in the at least one thixotropic polymer are in a weight ratio of from 95:5 to 50:50.

4. A paste according to claim 1, wherein the at least one thixotropic polymer of component A) has a nitrogen content from 10 to 150 mmole/100 g of solid resin.

5. A paste according to claim 1, wherein 65 to 90 wt. %, based on the total amount of the agents of B), of platelet-like fillers with a flatting effect are used as additional flatting agents.

6. A coating compound comprising:
   a) one or more film-forming hydroxy-functional binders,
   b) optionally one or more polyisocyanate crosslinking agents, and optionally one or more organic solvents, pigments, fillers, and lacquer additives, wherein said compound contains
   c) 5–60 wt-% of a matting paste comprising
      A) 5 to 30 wt. % of at least one thixotropic polymer selected from the group consisting of thixotropic (meth)acrylic copolymers, thixotropic polyesters and mixtures thereof, wherein the at least one thixotropic polymer of component A) is rendered thixotropic by the addition of thixotropic agents containing nitrogen to a non-thixotropic polymer selected from the group consisting of (meth)acrylic copolymers, polyesters and mixtures thereof;
      B) 15 to 45 wt. % of at least one agent selected from the group consisting of flatting agents, texturing agents and mixtures thereof;
      C) 30 to 65 wt. % of at least one organic solvent;
and optionally wetting and dispersing agents; rheology modifiers; catalysts selected from the group consisting of organic tin compounds and tertiary amines; and optionally further additives selected from the group consisting of anti-settling agents, leveling agents, plasticizers, and light stabilizers; wherein the proportions of components A), B) and C) add up to 100 wt. % and the weight ratio of the at least one thixotropic polymer of A): the at least one agent of B) is 1:6 to 1:0.8.

7. A process for the preparation of a flatting or texturing compound, comprising the steps of storing the paste according to claim 1 as a module; and adding the paste to a coating compound before using the compound.

8. A flatting or texturing coating compound comprising the paste according to claim 1.

9. A pigmented or unpigmented top coat layer comprising the paste according to claim 1.

10. The coating compound according to claim 6, wherein the thixotropic agents are selected from the group consisting of sag control agents, polyurethanes, polyurethane ureas, polyamides and mixtures thereof.

11. The coating compound according to claim 6, wherein the non-thixotropic polymer and the thixotropic agents in the at least one thixotropic polymer are in a weight ratio of from 95:5 to 50:50.

12. The coating compound according to claim 6, wherein the at least one thixotropic polymer of component A) has a nitrogen content from 10 to 150 mmole/100 g of solid resin.

* * * * *